US012408065B2

(12) United States Patent
Marquezan et al.

(10) Patent No.: US 12,408,065 B2
(45) Date of Patent: *Sep. 2, 2025

(54) ENTITIES AND METHODS FOR ENABLING CONTROL OF A USAGE OF COLLECTED DATA IN MULTIPLE ANALYTICS PHASES IN COMMUNICATION NETWORKS

(71) Applicant: HUAWEI TECHNOLOGIES CO., LTD., Shenzhen (CN)

(72) Inventors: Clarissa Marquezan, Munich (DE); Qing Wei, Munich (DE); Yang Xin, Shanghai (CN); Xiaobo Wu, Shenzhen (CN); Weiwei Chong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/762,366

(22) Filed: Jul. 2, 2024

(65) Prior Publication Data

US 2024/0357409 A1  Oct. 24, 2024

Related U.S. Application Data

(63) Continuation of application No. 18/161,649, filed on Jan. 30, 2023, now Pat. No. 12,052,600, which is a
(Continued)

(51) Int. Cl.
G06F 15/173 (2006.01)
H04W 24/10 (2009.01)

(52) U.S. Cl.
CPC .................. H04W 24/10 (2013.01)

(58) Field of Classification Search
None
See application file for complete search history.

(56) References Cited

U.S. PATENT DOCUMENTS 10,403,057 B1  9/2019 Fawcett et al.
2007/0118542 A1*  5/2007 Sweeney ............... G06F 16/84
(Continued)

FOREIGN PATENT DOCUMENTS

CN  111385420 A  7/2020
WO  2020071797 A1  4/2020
WO  2020093963 A1  5/2020

OTHER PUBLICATIONS

"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66, 3rd Generation Partnership Project, Valbonne, France (Jul. 2020).
(Continued)

Primary Examiner — Wing F Chan
Assistant Examiner — Andrew Woo
(74) Attorney, Agent, or Firm — Leydig, Voit & Mayer, Ltd.

(57) ABSTRACT

A first entity for a communication network is provided. The first entity is configured to receive a feature mapping indication from a second entity of the communication network. The feature mapping indication comprises characteristics of a relationship between a set of data samples and properties of data in the data samples of the set of data samples for an analytics model at an analytics stage, wherein the feature mapping indication comprises a request for a feature mapping data structure. The feature mapping data structure includes a second set of data samples based on the relationship between the set of data samples and the properties of the data in the data samples of the set of data samples for use with the analytics model at the analytics stage for an analytics consumer.

20 Claims, 7 Drawing Sheets

Related U.S. Application Data continuation of application No. PCT/CN2020/105978, filed on Jul. 30, 2020.

(56) References Cited

U.S. PATENT DOCUMENTS

| | | |
|---|---|---|
| 2019/0222489 A1 | 7/2019 | Shan |
| 2019/0230000 A1 | 7/2019 | Moghe et al. |
| 2020/0196155 A1 | 6/2020 | Bogineni et al. |
| 2020/0196169 A1 | 6/2020 | Dao et al. |
| 2020/0228422 A1 | 7/2020 | Chong |

OTHER PUBLICATIONS

"3rd Generation Partnership Project; Technical Specification Group Services and System Aspects; Study on enablers for network automation for the 5G System (5GS); Phase 2 (Release 17)," 3GPP TR 23.700-91 V0.4.0, pp. 1-186, 66 pages, 3rd Generation Partnership Project, Valbonne, France (Jun. 2020).

China Mobile, Huawei "Discussion about 3GPP Rel-17 eNA phase 2," SA WG2 Meeting #132, Xi'an, China, S2-1903098, Total 11 pages, 3rd Generation Partnership Project, Valbonne, France (Apr. 8-15, 2019).

Samsung et al., "New Key Issue on Multiple NWDAF instances," 3GPP SA WG2 Meeting #135, Split, Croatia, S2-1910575, Total 2 pages, 3rd Generation Partnership Project, Valbonne, France (Oct. 14-18, 2019).

Verizon UK Ltd., et al., "Increasing efficiency of data collection," 3GPP TSG SA WG2 Meeting #136, Reno, USA, S2-1912658, Total 3 pages, 3rd Generation Partnership Project, Valbonne, France (Nov. 18-22, 2019).

Huawei et al., "KI #2, KI #11, New Sol: Data collection reduction in hierarchical Lower-to-Upper Level NWDAFs Interactions," SA WG2 Meeting #139 E e-meeting, Elbonia, S2-2004533, Total 4 pages, 3rd Generation Partnership Project, Valbonne, France (Jun. 1-12, 2020).

Huawei et al., "KI #2, New Sol: Interactions of Hierarchical NWDAFs for Analytics Generation related to Large Areas," SA WG2 Meeting #139 E e-meeting, Elbonia, S2-2004534, Total 9 pages, 3rd Generation Partnership Project, Valbonne, France (Jun. 1-12, 2020).

Huawei et al., "KI #2, New Sol: Data collection in hierarchical Upper-to-Lower Levels NWDAF interactions," SA WG2 Meeting #139 E e-meeting, Elbonia, S2-2004535, Total 4 pages, 3rd Generation Partnership Project, Valbonne, France (Jun. 1-12, 2020).

ZTE, "Solution to flexible data collection and data analysis for hierarchical NWDAF architecture," SA WG2 Meeting #139E, Electronic, Elbonia, S2-2004540, Total 4 pages, 3rd Generation Partnership Project, Valbonne, France (Jun. 1-12, 2020).

Boutaba et al., "A comprehensive survey on machine learning for networking: evolution, applications and research opportunities," Journal of Internet Services and Applications (2018) 9:16, pp. 1-99, Springer Open (Published online: Jun. 21, 2018).

"3rd Generation Partnership Project; Technical Specification Group Services and System Aspects; System architecture for the 5G System (5GS); Stage 2 (Release 16)," 3GPP TS 23.501 V16.5.0, pp. 1-441, 3rd Generation Partnership Project, Valbonne, France (Jul. 2020).

"3rd Generation Partnership Project; Technical Specification Group Services and System Aspects; Procedures for the 5G System (5GS); Stage 2 (Release 16)," 3GPP TS 23.502 V16.5.0, pp. 1-594, 3rd Generation Partnership Project, Valbonne, France (Jul. 2020).

"3rd Generation Partnership Project; Technical Specification Group Core Network and Terminals; 5G System; Network Data Analytics Services; Stage 3 (Release 16)," 3GPP TS 29.520 V16.4.0, pp. 1-91, 3rd Generation Partnership Project, Valbonne, France (Jun. 2020).

\* cited by examiner

601

Receive a feature mapping indication at a first entity from a second entity of a communication network, the feature mapping indication defining characteristics of a relationship between a set of data samples and properties of data in the data samples of the set of data samples for an analytics model at an analytics stage, wherein the feature mapping indication comprises a request for a feature mapping data structure, the feature mapping data structure defining a second set of data samples based on the relationship between the set of data samples and the properties of the data in the data samples of the set of data samples for use with the analytics model at the analytics stage for an analytics consumer

603

Generate the feature mapping data structure at the first entity for use with the analytics model at the analytics stage based on at least one of the feature mapping indication received from the second entity and a feature provisioning policy, the feature provisioning policy defining a set of at least one of properties and processes to be applied to the data in the data samples of the set of data samples

Figure 6

ENTITIES AND METHODS FOR ENABLING CONTROL OF A USAGE OF COLLECTED DATA IN MULTIPLE ANALYTICS PHASES IN COMMUNICATION NETWORKS

CROSS-REFERENCE TO RELATED APPLICATIONS

This application is a continuation of U.S. patent application Ser. No. 18/161,649, filed on Jan. 30, 2023, which is a continuation of International Application No. PCT/CN2020/105978, filed on Jul. 30, 2020. All of the afore-mentioned patent applications are hereby incorporated by reference in their entireties.

TECHNICAL FIELD

Generally, embodiments of the present disclosure relate to the field of telecommunications. More specifically, although not exclusively, embodiments of the present disclosure relate to entities and methods for enabling control of a usage of collected data in multiple analytics phases in communication networks, in particular 5G networks.

BACKGROUND 5G systems (5GS) defined by 3GPP include provisions for a network data analytics function (NWDAF) defined as part of the 5G Core (5GC) architecture. The function can be used for predictive analytics, anomaly detection, trend analysis, and clustering for example, thereby paving the way towards utilizing the full potential of artificial intelligence (AI) and machine learning (ML) techniques to realize network automation with as little human interaction as possible.

For example, the NWDAF defined in the 3GPP standard TS 29.520 incorporates standard interfaces for collecting data by subscription or requesting a model from other network functions, which can be used to provide, e.g., inference based on a consumer analytics request. In some cases, the request can be associated with an analytics identifier (ID) that links parameters or metadata connected with the request with the requesting consumer. This enables analytics functions to be delivered in the network for, e.g., automation or reporting.

In 5GS from Release 16, there is no distinction between the capabilities of NWDAFs and those of AI Model Training & Inference functions. For example, Clause 6.4 in the 3GPP standard TS 23.288 defines a Service Experience analytics ID, which relies on model training. The procedure description for analytics generation also includes a description as to how a NWDAF can estimate a service experience. However, throughout the discussion of how this analytics ID is generated, the implication is that an NWDAF will perform both model training (for instance, when the NWDAF uses no-real time service data from analytics functions (AFs)) and, at the same time, model inference (e.g., when a NWDAF generates an estimation that can be consumed by a policy control function (PCF)).

Model training and model inference are two different functionalities, each with specific requirements. For example, model training relies on data that has been collected offline, whilst model inference uses data collected in real-time (or near real time). Model training may require extensive datasets, while inference on the other hand can utilise a relatively smaller dataset.

Generally speaking, there should be a separation between datasets that are used for training and datasets that are used for inference because using the same datasets for both will simply result in an output at an inference phase that is exactly the same as the output of the training phase. Nevertheless, for both training and inference, collected data should be initially prepared in order to enable it to be used as input for a model. For example, feature engineering techniques could be applied to data samples in the case of both training and inference.

In 5GS Release 16, different NWDAF instances can be responsible for the generation of different analytics (indicated by the analytics IDs), or the same analytics for different areas of interest. However, dedicated hardware for data model training is expensive. Furthermore, although different NWDAFs could be responsible for the generation of analytics for specific serving areas (as defined in, e.g., clause 6.3.13 of the 3GPP standard TS 23.501), it is not defined how data collection and the exchange of such collected data among the different NWDAFs is handled for the various stages of analytics generation.

For example, there can be communication between AI entities performing either inference or training, testing, or validation of models, but such communication does not comprise any detail about how data used for these analytics stages are related with respect to the interactions between the entities. Furthermore, there is a focus on the mechanisms for data collection itself, but not on how any collected data can then be further managed and controlled for the analytics stages. In addition, data selection is defined on the basis of single domain specific models, which is ultimately unsuitable for different consumers requiring information based on different analytics stages for different model types.

Release 16 of the 5G specifications allows AI Training Service/Platform and NWDAF interaction. However, an NWDAF does not have any service exposing datasets and is not able to make a distinction between training data and inference data. As per Release 16, all NWDAF instances have to collect data and perform feature engineering. This therefore increases the load of the NWDAFs and the operational costs of mobile operators.

The lack of a mechanism to properly control the use of collected data in multiple analytics phases will ultimately be observed at the consumer side. For example, a consumer might receive an analytics output with a high probability of assertion (i.e., values of the analytics output in the notification of NWDAF which are generated at the inference stage). Nevertheless, this high accuracy can be false because the data used for inference could have been mixed with the data used for training the model. Thus, analytics consumers run the risk of making decisions based on imprecise analytics outputs.

SUMMARY

According to a first aspect, a first entity is provided for a communication network, in particular a mobile communication network, the first entity configured to receive a feature mapping indication from a second entity of the communication network, the feature mapping indication defining characteristics of a relationship between a set of data samples and properties of data in the data samples of the set of data samples for an analytics model at an analytics stage, wherein the feature mapping indication comprises a request for a feature mapping data structure, the feature mapping data structure defining a second set of data samples based on the relationship between the set of data samples and the properties of the data in the data samples of the set of data samples for use with the analytics model at the analytics stage for an analytics consumer, and generate the feature mapping data structure for use with the analytics model at the analytics stage based on at least one of the feature mapping indication received from the second entity and a feature provisioning policy, the feature provisioning policy defining a set of at least one of properties and processes to be applied to the data in the data samples of the set of data samples.

The first entity, which is in the form of an enhanced entity for feature control, enables a reduction in the processing load and preparation of raw collected data for training or inference. This is because, as a result of at least one of the first and second entities, not all entities related to analytics in a mobile network (e.g., all NWDAFs) need to process the collected raw data (e.g., number of UEs in a Cell, N3 throughput value of the User Plane Function (UPF) for a given point in time, etc.), or apply feature engineering techniques (e.g., calculate the skewness of the N3 throughput of UPF) to generate pre-processed data (e.g., feature datasets) that is used as input for the calculation/generation of an analytics output. In examples, specific entities of the mobile operator (e.g., NWDAF) can be enhanced as described herein, and such entities can control the use of pre-processed data (i.e., features) to at least one of multiple AI training platforms and models.

In an example, where at least one of the first and second entity is an NWDAF, one intra-Public Land Mobile Network (PLMN) region can therefore be used to obtain the feature datasets from another NWDAF in a different intra-PLMN region without having to perform any specific data collection directly in the different region. Accordingly, an operator of the communication network can define, in the form of the feature provisioning policy for example, a mechanism for securing the privacy of the data from each one of the different regions (e.g., anonymization, masking, etc.).

Furthermore, online datasets (to be used for, e.g., inference) can be exchanged among different intra-PLMN NWDAF instances. For instance, data collection can be performed from lower level to higher level NWDAFs (for NWDAFs organized in a hierarchical deployment, for example).

In an implementation of the first aspect, the first entity can be further configured to obtain one or more feature mapping data structures for use with the analytics model at the analytics stage based on one or more further feature mapping data structures from one or more other entities of the communication network. The analytics stage can comprise one or more of an inference stage, a training stage, a testing stage, a validation stage, an offline data collection, and an online data collection. The feature mapping indication can comprise a direct request for generation of a feature mapping data structure, the direct request comprising at least one of an information field defining a request for creation of the feature mapping data structure and a flag for indicating a requirement for immediate retrieval of the feature mapping data structure. The feature mapping indication can comprise a direct request for retrieval of a feature mapping data structure according to a set of criteria comprising one or more filters, the one or more filters enabling a selection of the data samples to be associated with the feature mapping data structure. The feature mapping indication can comprise an indirect request for a feature mapping data structure related to a request for an analytics output from an analytics model, and he first entity is further configured to generate or obtain the feature mapping structure for supporting inference using the analytics model for the analytics output. The feature mapping indication can comprise an indirect request for a feature mapping data structure related to a request for model training, and the first entity is further configured to generate or obtain the feature mapping data structure for supporting the model training. The request for the feature mapping data structure can comprise at least one of the data representing a flag for indicating immediate retrieval of the feature mapping data structure and a data collection mode.

In an example, the first entity can be further configured to provide the feature mapping data structure to the second entity or another entity of the communication network in response to the feature mapping indication. The first entity can be further configured to use the feature mapping data structure to process an analytics output inference request or process a model training request or further process a request to fetch the feature mapping data structure.

In an implementation of the first aspect, at least one of the first entity and the second entity is logically co-located with a network exposure function of the communication network. The first entity can be further configured to access one or more data repositories, or is logically co-located with a data repository, the data repository comprising the data samples of the set of data samples. At least one of the first entity and the second entity can be a network data analytics function of the communication network.

In an example, the first entity can be further configured to provide at least one of an identification for a feature mapping data structure obtained in accordance with the feature mapping indication, and an identification of a storage repository of the communication network, the storage repository comprising the feature mapping data structure.

The direct request for creation of the feature mapping data structure can comprise any one or more of the following information fields: an analytics type identification, a model type identification, a model version identification, an analytics stage, an analytics consumer identification, a type of data, a type of feature, an aggregation level per type of feature, a statistical property of a data sample, a statistical method to be applied, an area of interest, a target of analytics reporting, analytics filter information, an interval of time for sample selection, at least one of a minimum and maximum number of samples for sample selection, a network slice identification, a network operator identification, a deadline for generating and providing the feature mapping data structure, and a data collection mechanism to be used for the retrieval of at least one of raw data and pre-processed data.

The first entity can be further configured to enable filtering, and the direct request for retrieval of the feature mapping data structure can comprise any one or more of the following information fields: a feature mapping identification, an analytics type identification, a model type identification, a model version identification, an analytics stage, a consumer identification, a network slice identification, a network operator identification, an area of interest, a list or group of user equipment, an interval of time for feature sample selection, a statistical property of data samples, and a statistical method to be applied.

The feature mapping data structure can comprise any one or more of the following information fields: a feature mapping identification, an identification of an analytics consumer related to the feature mapping data structure, an analytics type identification, a type of feature mapping, a model type for the analytics identification, a model version for each model type, a model stage, a statistical property of data samples, a type of data, a feature type, a feature sample value, a reference for the feature sample identification, a reference for an entity storing the feature sample, a reference for an entity storing the data samples, and a timestamp of at least one of a created/updated feature and data samples.

The feature provisioning policy can comprise any one or more of the following information fields: an identification of an analytics consumer of a feature, a network slice identification, a network operator identification, a type of feature mapping, at least one of an allowed and restricted feature selection technique, at least one of an allowed and restricted feature type, at least one of an allowed and restricted area of interest, at least one of an allowed and restricted type of analytics models, an aggregation level per type of feature, and an anonymization rule or rules.

According to a second aspect, a first entity is provided for a communication network, in particular a mobile communication network, the first entity configured to receive a feature mapping indication from a second entity of the communication network, the feature mapping indication defining characteristics of a relationship between a set of data samples and properties of data in the data samples of the set of data samples for an analytics model at an analytics stage, wherein the feature mapping indication comprises a request for a feature mapping data structure, the feature mapping data structure defining a second set of data samples based on the relationship of the set of data samples and the properties of the data in the data samples of the set of data samples for use with the analytics model at the analytics stage for an analytics consumer, the first entity being further configured to generate the feature mapping data structure for use with the analytics model at the analytics stage based on at least one of the feature mapping indication received from the second entity, and a feature provisioning policy, the feature provisioning policy defining a set of at least one of properties and processes to be applied to the data in the data samples of the set of data samples, wherein the first entity is further configured to provide the feature mapping data structure to the second entity or another entity of the communication network in response to the feature mapping indication.

According to a third aspect, a first entity is provided for a communication network, in particular a mobile communication network, the first entity configured to receive a feature mapping indication from a second entity of the communication network, the feature mapping indication defining characteristics of a relationship between a set of data samples and properties of data in the data samples of the set of data samples for an analytics model at an analytics stage, wherein the feature mapping indication comprises a request for a feature mapping data structure, the feature mapping data structure defining a second set of data samples based on the relationship of the set of data samples and the properties of the data in the data samples of the set of data samples for use with the analytics model at the analytics stage for an analytics consumer, the first entity being further configured to generate the feature mapping data structure for use with the analytics model at the analytics stage based on at least one of the feature mapping indication received from the second entity, and a feature provisioning policy, the feature provisioning policy defining a set of at least one of properties and processes to be applied to the data in the data samples of the set of data samples, wherein the first entity is further configured to use the feature mapping data structure to generate analytics information.

According to a fourth aspect, a second entity is provided for a communication network, in particular a mobile communication network, the second entity configured to provide a feature mapping indication to a first entity of the communication network, the feature mapping indication defining characteristics of a relationship between a set of data samples and properties of data in the data samples of the set of data samples for an analytics model at an analytics stage, wherein the feature mapping indication comprises a request for a feature mapping data structure, the feature mapping data structure defining a second set of data samples based on the relationship between the set of data samples and the properties of the data in the data samples of the set of data samples for use with the analytics model at the analytics stage for an analytics consumer.

The second entity can be further configured to receive the feature mapping data structure for use with the analytics model at the analytics stage, and use the feature mapping data structure to generate analytics information.

The generated analytics information can comprise an analytics output as a result of an inference stage, or a trained model as a result of a model training phase. In another example, the generated analytics information can comprise a new feature mapping data structure resulting from further processing at the second entity (e.g., that uses the received feature mapping data structure and further data samples). The new feature mapping data structure can be sent to another entity of the communication network. In another example, the generated analytics information can comprise a received feature mapping data structure that is forwarded without any further processing.

In an implementation of the fourth aspect, the second entity can be further configured to send the generated analytics information to another entity. The second entity can be further configured to receive a response from the first entity, the response comprising at least one of an identification for a feature mapping data structure obtained in accordance with the feature mapping indication and an identification of a storage repository of the communication network comprising the feature mapping data structure. The second entity can be further configured to request the feature mapping data structure from the storage repository of the communication network, wherein the request includes the received identification for a feature mapping data structure, and use the feature mapping data structure to generate analytics information for the analytics consumer.

In some examples, at least one of the first entity and second entity is an entity enhanced with feature control capability.

According to a fifth aspect, a method is provided, in a communication network, in particular a mobile communication network, the method comprising receiving, at a first entity, a feature mapping indication from a second entity of the communication network, the feature mapping indication defining characteristics of a relationship between a set of data samples and properties of data in the data samples of the set of data samples for an analytics model at an analytics stage, wherein the feature mapping indication comprises a request for a feature mapping data structure, the feature mapping data structure defining a second set of data samples based on the relationship between the set of data samples and the properties of the data in the data samples of the set of data samples for use with the analytics model at the analytics stage for an analytics consumer, and generating, at the first entity, the feature mapping data structure for use with the analytics model at the analytics stage based on at least one of the feature mapping indication received from the second entity and a feature provisioning policy, the feature provisioning policy defining a set of at least one of properties and processes to be applied to the data in the data samples of the set of data samples.

The method can further comprise obtaining, at the first entity, one or more feature mapping data structures for use with the analytics model at the analytics stage based on one or more further feature mapping data structures from one or more other entities of the communication network. The analytics stage can comprise one or more of an inference stage, a training stage, a testing stage, a validation stage, an offline data collection, and an online data collection.

The feature mapping indication can comprise a direct request for generation of a feature mapping data structure, the direct request comprising at least one of an information field defining a request for creation of the feature mapping data structure and a flag for indicating a requirement for immediate retrieval of the feature mapping data structure. The feature mapping indication can comprise a direct request for retrieval of a feature mapping data structure according to a set of criteria comprising one or more filters, the one or more filters enabling a selection of the data samples to be associated with the feature mapping data structure.

The feature mapping indication can comprise an indirect request for a feature mapping data structure related to a request for an analytics output from an analytics model, the method further comprising, at the first entity, generating or obtaining the feature mapping structure for supporting inference using the analytics model for the analytics output. The feature mapping indication can comprise an indirect request for a feature mapping data structure related to a request for model training, the method further comprising, at the first entity, generating or obtaining the feature mapping data structure for supporting the model training. The request for the feature mapping data structure can comprise at least one of the data representing a flag for indicating immediate retrieval of the feature mapping data structure and data collection mode.

The method can further comprise, at the first entity, providing the feature mapping data structure to the second entity or another entity of the communication network in response to the feature mapping indication. The method can further comprise, at the first entity, using the feature mapping data structure to process an analytics output inference request or process a model training request or further process a request to fetch the feature mapping data structure. The method can further comprise, at the first entity, accessing one or more data repositories comprising at least one of the data samples and the set of pre-processed data samples. The method can further comprise, at the first entity, providing at least one of an identification for the feature mapping data structure obtained in accordance with the feature mapping indication, and an identification of a storage repository of the communication network comprising the feature mapping data structure.

In an example, the direct request for creation of the feature mapping data structure comprises any one or more of the following information fields: an analytics type identification, a model type identification, a model version identification, an analytics stage, an analytics consumer identification, a type of data, a type of feature, an aggregation level per type of feature, a statistical property of a data sample, a statistical method to be applied, an area of interest, a target of analytics reporting, analytics filter information, an interval of time for sample selection, at least one of a minimum and maximum number of samples for sample selection, a network slice identification, a network operator identification, a deadline for generating and providing the feature mapping data structure, and a data collection mechanism to be used for the retrieval of at least one of raw data and pre-processed data.

The method can further comprise filtering the direct request for retrieval of a feature mapping data structure using any one or more of the following information fields: a feature mapping identification, an analytics type identification, a model type identification, a model version identification, an analytics stage, a consumer identification, a network slice identification, a network operator identification, an area of interest, a list or group of user equipment, an interval of time for feature sample selection, a statistical property of data samples, and a statistical method to be applied.

The feature mapping data structure can comprise any one or more of the following information fields: a feature mapping identification, an identification of an analytics consumer related to the feature mapping data structure, an analytics type identification, a type of feature mapping, a model type for the analytics identification, a model version for each model type, a model stage, a statistical property of data samples, a type of data, a feature type, a feature sample value, a reference for the feature sample identification, a reference for an entity storing the feature sample, a reference for an entity storing the data samples, and a timestamp of at least one of a created/updated feature and data samples.

The feature provisioning policy can comprise any one or more of the following information fields: an identification of an analytics consumer of a feature, a network slice identification, a network operator identification, a type of feature mapping, at least one of an allowed and restricted feature selection technique, at least one of an allowed and restricted feature type, at least one of an allowed and restricted area of interest, at least one of an allowed and restricted type of analytics models, an aggregation level per type of feature, and an anonymization rule.

According to a sixth aspect, a method is provided, in a communication network, in particular a mobile communication network, the method comprising providing, from a second entity, a feature mapping indication to a first entity of the communication network, the feature mapping indication defining characteristics of a relationship between a set of data samples and properties of data in the data samples of the set of data samples for an analytics model at an analytics stage, wherein the feature mapping indication comprises a request for a feature mapping data structure, the feature mapping data structure defining a second set of data samples based on the relationship between the set of data samples and the properties of the data in the data samples of the set of data samples for use with the analytics model at the analytics stage for an analytics consumer.

In an implementation of the sixth aspect, the method can further comprise, at the second entity, receiving the feature mapping data structure for use with the analytics model at the analytics stage, and using the feature mapping data structure to generate analytics information. The method can further comprise, at the second entity, sending the generated analytics information to another entity. The method can further comprise, at the second entity, receiving a response from the first entity, the response comprising at least one of an identification for the feature mapping data structure obtained in accordance with the feature mapping indication and an identification of a storage repository of the communication network comprising the feature mapping data structure. The method can further comprise, at the second entity, requesting the feature mapping data structure from the storage repository of the communication network, wherein the request includes the received identification for a feature mapping data structure, and using the feature mapping data structure to generate analytics information for the analytics consumer.

According to a seventh aspect, a non-transitory machine-readable storage medium encoded with instructions is provided for enabling control of a usage of collected data in an analytics stage in a communication network, the instructions executable by a processor of a machine whereby to cause the machine to receive a feature mapping indication from a second entity of the communication network, the feature mapping indication defining characteristics of a relationship between a set of data samples and properties of data in the data samples of the set of data samples for an analytics model at the analytics stage, wherein the feature mapping indication comprises a request for a feature mapping data structure, the feature mapping data structure defining a second set of data samples based on the relationship between the set of data samples and the properties of the data in the data samples of the set of data samples for use with the analytics model at the analytics stage for an analytics consumer, and generate the feature mapping data structure for use with the analytics model at the analytics stage based on at least one of the feature mapping indication received from the second entity and a feature provisioning policy, the feature provisioning policy defining a set of at least one of properties and processes to be applied to the data in the data samples of the set of data samples.

According to an eighth aspect, a non-transitory machine-readable storage medium encoded with instructions is provided for enabling control of a usage of collected data in an analytics stage in a communication network, the instructions executable by a processor of a machine whereby to cause the machine to provide a feature mapping indication to a first entity of the communication network, the feature mapping indication defining characteristics of a relationship between a set of data samples and properties of data in the data samples of the set of data samples for an analytics model at an analytics stage, wherein the feature mapping indication comprises a request for a feature mapping data structure, the feature mapping data structure defining a second set of data samples based on the relationship between the set of data samples and the properties of the data in the data samples of the set of data samples for use with the analytics model at the analytics stage for an analytics consumer.

BRIEF DESCRIPTION OF THE DRAWINGS

For a more illustrative understanding of the present disclosure, reference is now made, by way of example only, to the following descriptions taken in conjunction with the accompanying drawings, in which:

FIG. 6 is a schematic representation of a method according to an example; and

DETAILED DESCRIPTION

Figure 1:
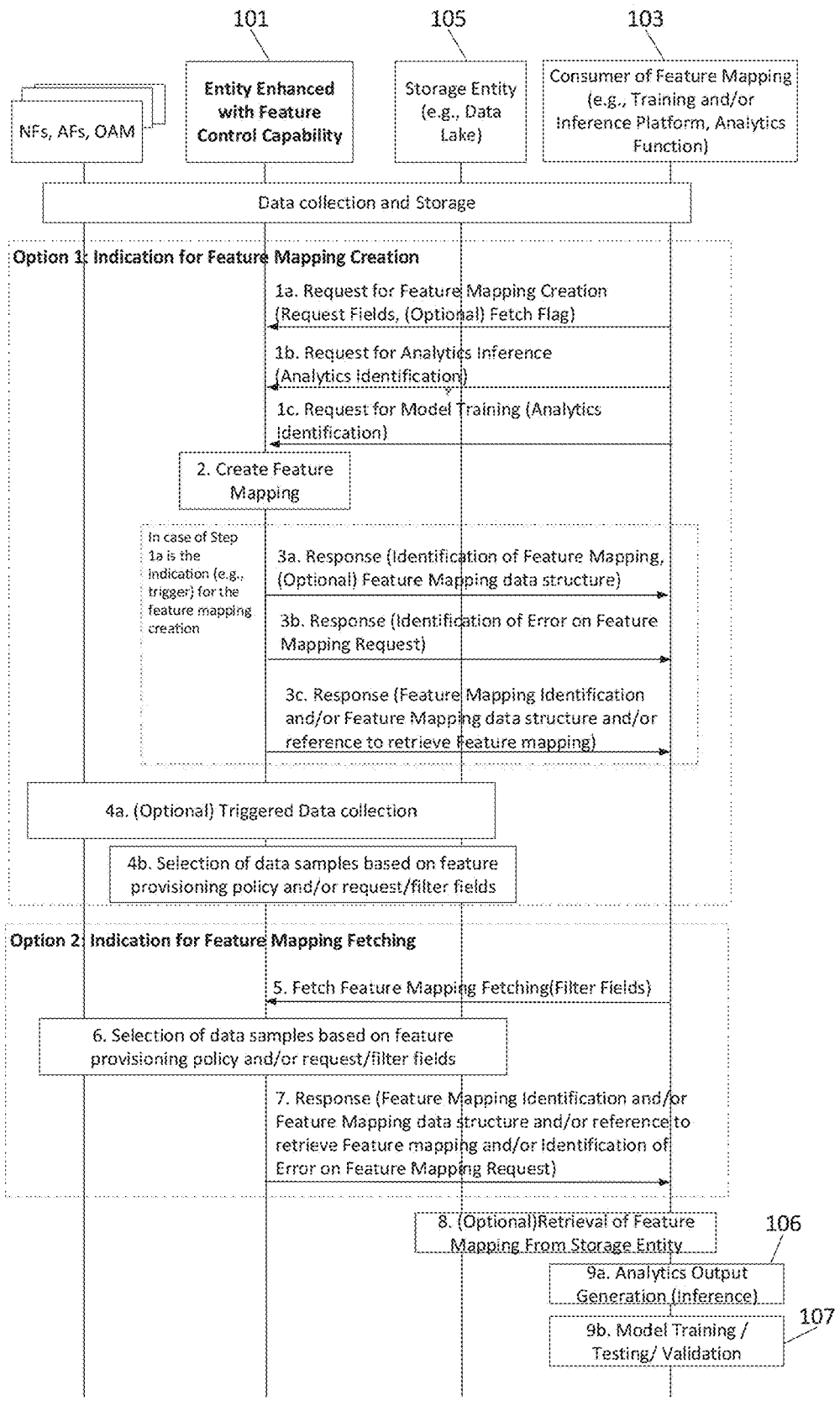
FIG. 1 is a schematic representation of processes for feature control, according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein. Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a", "an", and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises", "comprising", "includes", and/or "including", when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

According to an example, a mobile communication network, such as a 5G network for example, is provided with a Feature Control capability. Mobile operators, for instance, can provide existing network functions (NFs), such as an NWDAF, a user data repository (UDR), or Publication/Subscription Platforms (that support the distribution of information in the operator's network) with this Feature Control capability.

According to an example, an entity with Feature Control capability is able to:
  create a feature mapping data structure, and
  provide the feature mapping data structure to consumers (e.g., at least one of AI Model Training, AI Inference Platforms and NWDAFs).

The feature mapping can be based on at least one of a feature provisioning policy and a request for feature mapping, as will be described in more detail below.

FIG. 1 is a schematic representation of processes for feature control according to an example. With reference to FIG. 1, a feature mapping is a data structure that describes the relationship (e.g., mapping) of data samples (e.g., at least one of raw data sample and pre-processed data sample) and data properties that are used for various analytics stages. The analytics stages can be analytics generation (e.g., inference), model training, model validation, model testing, such models being later used for the analytics generation.

An analytics stage is a property that describes at least one of a certain phase of an analytics process (inference, training, validation, testing, re-training, etc.) and the status of such an analytics process phase in the mobile network (e.g., inference in-production, training in-testing, etc.).

A feature provisioning policy defines at least one of the set of allowed and restricted properties for the selection of data samples to be included in a feature mapping.

A raw data sample is information that is exposed by at least one of NFs (UDM, AMF, SMF, etc.), AFs, repositories (e.g., UDR, USDF) and OAM for instance in the form of an event or an entry from a dataset, measurement, or an alarm. A pre-processed data sample is information that results from applying a processing technique over raw collected data (e.g., average, smoothing techniques, statistical techniques etc.). A sample dataset is a set of raw data samples, and a feature dataset is a set of pre-processed data samples. The terms "feature dataset" and "pre-processed data samples" are used as synonymous herein.

With reference to FIG. 1, at least two groups of options for an entity that is enhanced with feature control to provide a feature mapping to consumers of the feature mapping are provided:

Option 1: An Entity Enhanced with Feature Control 101 obtains an indication for the creation of a feature mapping. This indication can be of the following types.

A Consumer of Feature Mapping 103 explicitly requests the creation of a feature mapping, in a step 1a. In the explicit request (e.g., feature mapping indication comprising a direct request for generation of a feature mapping data structure), request field parameters (e.g., request for creation of the feature mapping data structure) are included. Optionally, a fetch flag parameter is included. The Entity Enhanced with Feature Control 101 receiving the request fields can check a feature provisioning policy in order to at least one of verify and authorize whether the requested fields for the creation of the feature mapping are allowed. Upon successful verification and authorization, the feature mapping data structure can be created according to at least one of the request for the creation (e.g., feature mapping indication) and the feature provisioning policy. The fetch flag parameter indicates that the consumer 103 requests the creation of the feature mapping and wants the immediate retrieval of the feature mapping data structure created upon such request. In this case of explicit request for feature mapping creation, the steps 1a, 2, 3a or 3b or 3c (and step 8 if step 3c is executed), 4a, and 4b of FIG. 1 can be executed. The order of the steps 3 and 4 can be alternated depending on whether the fetch flag has been used. If the fetch flag is included, then step 4 can be executed before step 3, and vice-serve in case the fetch flag is not included in the request for the creation of feature mapping. When step 3a is executed, a response to the Consumer 103 can contain the identification of the created feature mapping data structure, and, optionally, the feature mapping data structure itself. Step 3b can be executed in case an error occurred during the creation of the feature mapping. Examples of such errors can be: the request fields are not authorized according to the feature provisioning policy, the requested fields are authorized but the Entity Enhanced with Feature Control 101 cannot apply the request fields for the generation of the feature mapping (e.g., it has no access to data samples for the creation of the required feature mapping). If step 3c is executed, the response to the Consumer 103 can contain the identification of the created feature mapping data structure, and, optionally, a reference for a Storage Entity 105 from which the feature mapping identification can be retrieved (as per step 8 in FIG. 1).

The Entity Enhanced with Feature Control 101 receives a request for analytics output, or analytics inference request (e.g., feature mapping indication comprising an indirect request for a feature mapping data structure related to a request for an analytics output from an analytics model), in a step 1b. The request for the analytics output can also comprise the Data Collection, DC, mode parameter. In this case, the Entity Enhanced with Feature Control 101 can check whether there is already an existing feature mapping corresponding to the request for analytics inference (i.e. the same analytics ID). If there is no feature mapping for the analytics ID in question relating to the request, for the consumer 103 and corresponding to the analytics stage in question (in this case, inference stage), then the Entity Enhanced with Feature Control 101 can create, in a step 2, the feature mapping that will be associated with the analytics ID included in the request (1b) for analytics inference. The creation of the feature mapping can be performed in the same way as described above in the case of the explicit request (1a) for feature mapping creation. The Entity Enhanced with Feature Control 101 can check at least one of a feature provisioning policy associated with the analytics identification and the identification of the consumer and if authorized create the feature mapping. In this case, the Entity Enhanced with Feature Control 101 can also have the capability to generate the analytics output (the inference output) itself. In this sense, it is an option that the Entity Enhanced with Feature Control 101 can trigger data collection of data samples which can then be associated with the feature mapping necessary for the analytics inference, if such entity has such capability. For this case, the steps 1b, 2, 4 (a,b), and 9a of FIG. 1 can be executed. The analytics output 106 generated in step 9a of FIG. 1 is thus based on the created feature mapping.

The Entity Enhanced with Feature Control 101 receives a request for model training, e.g., such request indicates that an analytics model associated with an analytics identification needs to be trained (e.g., feature mapping indication comprises an indirect request for a feature mapping data structure related to a request for model training), in a step 1c. The request for the model training can also comprise the Data Collection, DC, mode parameter. In this case, the Entity Enhanced with Feature Control 101 can check whether there is already an existing feature mapping for such a request for model training. If there is not a feature mapping for the analytics identification included in the request for model training, for such a consumer and corresponding to the analytics stage (in this case, training stage), the Entity Enhanced with Feature Control 101 can create a feature mapping that will be associated with the analytics identification included in the request for analytics inference. In an example, the request is for model training, but the request can be also for model validation, model testing and so on. These are analytics stages that are not related to inference, but to the model creation itself. The creation of the feature mapping can be performed in the same way as described above in the case of an explicit request (1a) for feature mapping. In this case, the Entity Enhanced with Feature Control 101 might have also the capability to train, or validate, or test a model (e.g., the algorithm to predict values of a given situation) itself. If the Entity Enhanced with Feature Control 101 has the capability to collect data for training, or testing, or validation, it may perform that or the entity can use available data samples to be associated with the feature mapping necessary for the model training, or testing, or validation. For this case, the steps 1c, 2, 4 (a,b), and 9b of FIG. 1 can be executed. The trained, or tested, or validated model 107 generated in step 9b of FIG. 1 is thus based on the created feature mapping.

Two steps in FIG. 1 are common to the above described alternatives of how the Entity Enhanced with Feature Control 101 receives a request. The first one is the step 2 of FIG. 1: Create Feature Mapping. The second one is step 4b of FIG. 1.

In step 2 of FIG. 1 (create feature mapping), the Entity Enhanced with Feature Mapping Control 101 can execute the creation of the feature mapping data structure. According to an example, a feature mapping data structure is a second set of data samples for use with the analytics model at the analytics stage for an analytics consumer. The second set of data samples results from processing a first set of data samples. Examples of processing are statistical operations, such as averaging values, smoothing and so on.

In step 4 (a,b) of FIG. 1, there is the possibility that the Entity Enhanced with Feature Control 101 can also trigger data collection as per step 4a of FIG. 1. The trigger of the data collection is related to the parameters received in step 1 (a,b,c) of FIG. 1. If the requests received in step 1 (a,b,c) includes a data collection (DC) mode parameter, the Entity Enhanced with Feature Control 101 can use the indicated DC mode to trigger the appropriate mechanism for data collection. In an example, the DC mode indicates the type of collection mechanism to be considered for the data to be associated with the feature mapping data structure. This parameter can be set to, for example, at least one of a) "runtime", which specifies that data collection is to be performed by NFs sending periodic notifications of the events to be collected; or b) "offline", which specifies that mechanisms that reduce notification signalling from NFs should be applied for the collection of the data; and c) "historical", which specifies that data should be retrieved from some storage. When the "historical" DC mode is included, the interval of the historical time window can be included as an input parameter. Based on the acquisition of data using the indicated DC mode mechanism specified in step 4a of FIG. 1, the Entity Enhanced with Feature Control Capability 101 can execute step 4b of FIG. 1. Step 4b relates to the selection and association of data samples (collected in step 4a), to a feature mapping data structure. The selection (or association) of data samples can be based on at least one of the feature provisioning policy and requests or filter fields. It is possible that further obtained feature mapping data structures are also used in the creation (association) of data samples for the requested feature mapping data structure.

With further reference to FIG. 1, option 2: An Entity Enhanced with Feature Control 101 obtains an indication for Feature Mapping Fetching.

The Entity Enhanced with Feature Control 101 can receive a request for fetching, or retrieval of a feature mapping data structure (e.g., the feature mapping indication comprises a direct request for retrieval of a feature mapping data structure), in a step 5. The Consumer 103 can request the retrieval of a feature mapping data structure indicating in the request the feature mapping identification or one or more filters for requesting feature mapping fetching (e.g., a set of criteria comprising one or more filters, the one or more filters enabling a selection of the data samples to be associated with the feature mapping data structure). The filter parameters allow the Enhanced Entity with Feature Control 101 to determine, e.g., select, the feature mapping data structured to be provided to the consumer based on, for instance, at least one of the indicated analytics ID and analytics stage in the filter parameters. If the identification of the feature mapping is included in the request, the Enhanced Entity with Feature Control 101 can directly identify that the created feature mapping should be provided to the consumer 103. In this case, the steps 5, 6, 7, (optionally step 8) of FIG. 1 can be executed. Depending on the role of the consumer 103, at least one of steps 9a and 9b can be further executed. Step 7 depicts possible outcomes of a request for fetching a feature mapping data structure according to option 2 in step 5. In the example of FIG. 1, this is equivalent to the steps 3a, 3b, 3c of option 1. The same type of information, depending on the situation (if successful or not), can be transmitted from the Entity Enhanced with Feature Control 101 to the Consumer 103. In addition, the same process of authorization of the filter fields included in the request can be performed upon receiving such a request. The Entity Enhanced with Feature Control 101 can check a feature provisioning policy as to whether the requested filter fields are permitted for use.

Common to both options of retrieval of the feature mapping structure is that the Entity Enhanced with Feature Control 101 can perform any one of the following:

Authorization of the request based on the information of the feature provisioning policy.

Depending on the consumer type and the feature provisioning policy, the Entity Enhanced with Feature Control 101 could apply anonymization techniques to hide some of the information of the feature mapping data structure before providing it to the consumer.

Entity Enhanced with Feature Control 101 might interact with a Storage entity 105 in order to provide to such Storage entity 105 the feature mapping data structure. In this case, it is possible that the Storage Entity 105 has the data samples, and that the provided feature mapping data structure contains all the fields except the actual data samples. With all the fields of the feature mapping data structure except the data samples, the Storage Entity 105 can use the information of the tuple (analytics ID, consumer, model type, model version, model stage, type of feature mapping, statistical properties) in order to determine (i.e., select) stored data samples to be associated with the feature mapping data structure. In this sense, when there is the involvement of an Storage Entity 105 external to the Entity Enhanced with Feature Control 101, the process of selection of data samples based on at least one of a feature provisioning policy, a creation request and filter request fields (Steps 4b and 6 in FIG. 1) can be divided in two steps: i) the Entity Enhanced with Feature Control 101 can assemble the tuple (analytics ID, consumer, model type, model version, model stage, type of feature mapping, statistical properties) as core fields of the feature mapping data structure and send this core information to the Storage Entity, and ii) the Storage Entity can identify data samples to be further associated with the feature mapping data structure.

The data structures, and parameters of the services defined for the Entity Enhanced with Feature Control 101 are described according to an example below.

The fields for a request of feature mapping creation (e.g., direct request for generation of a feature) obtained by the Entity Enhanced with Feature Control 101 can comprise any of the following information:

analytics type identification (e.g., analytics ID)

model type identification (e.g., regression, neural networks)
model version identification
model stage (e.g., training, inference, testing, validation)
consumer identification (e.g., NF ID, Address of consumer, etc.)
data collection mode (e.g., runtime or offline)
type of data (e.g., the type of input data associated with an analytics ID)
type of feature (e.g., average, maximum, minimum, skewness, etc.)
aggregation level per type of feature,
statistical properties of data sample (e.g., describes properties related to the dataset to be used for analytics generation, e.g., sparse data, aggregated data, smoothed data, etc.),
statistical methods to be applied (e.g., smoothing window, average, mean values, etc.)
area of interest
target of analytics reporting (e.g., specific UE or list of UEs, group of UEs, any UE)
analytics filter information (e.g., application identification, QoS parameters, data network identification (e.g., DNN, DNAI), NF Instance IDs, NF Set IDs, or NF types, location information such as path in an area of interest)
interval of time for samples selection
at least one of minimum and maximum number of samples selection
network slice identification
network operator identification The filters for a request for feature mapping fetching (e.g., direct request for retrieval of a feature mapping data structure) received by the Entity Enhanced with Feature Control 101 can comprise any of the following information:
feature mapping identification
analytics type identification (e.g., analytics ID)
model type identification (e.g., regression, neural networks)
model version identification
model stage (e.g., training, inference, testing, validation)
consumer identification (e.g., NF ID, Address of consumer, etc.)
network slice identification (e.g., S-NSSAI, NSI)
network operator identification (e.g., PLMN ID)
area of interest (e.g., list of TAIs)
list of UEs, or group of UEs
interval of time for feature sample selection
statistical properties of data samples (e.g., describes properties related to the dataset to be used for analytics generation, e.g., sparse data, aggregated data, smoothed data, etc.),
statistical methods to be applied (e.g., smoothing window, average, mean values, etc.).

A feature mapping data structure that is provided to other entities by the Entity Enhanced with Feature Control 101 can comprise any combination of the following fields:
feature mapping identification,
identification of consumer related to the feature mapping data structure,
an analytics type identification,
type of feature mapping (e.g., raw data samples; pre-processed data samples),
list of model types for the analytics identification,
list of model version for each model type,
list of model stages (e.g., model training, model testing, model inference, model validation),
list of statistical properties of samples,
for each tuple of (model type, model version, model stage, type of feature mapping, statistical properties), any of the following:
list of type of data,
list of feature types (for each type of data),
at least one of list of feature samples value (for each feature type), reference for the feature sample identification and reference for the entity storing feature samples,
at least one of list of data samples (for each data type) and reference for entity storing data samples,
at least one of a timestamp of a created/updated feature and data samples.

A feature provisioning policy can be composed of any combination of the following fields:
Identification of consumer of feature mapping (e.g., NF Type, NF ID, Address of Service consuming, etc.),
network slice identification,
network operator identification,
type of feature mapping (e.g., raw data samples; pre-processed data samples),
at least one of allowed and restricted feature selection techniques (e.g., at least one of applicable statistical properties and methods),
at least one of allowed and restricted feature types,
at least one of allowed and restricted areas of interest,
at least one of allowed and restricted types of analytics models,
aggregation level per type of feature (e.g., per interval of time in second or minutes or hours; or geographical such as per Cell, per TA, or per UE),
Anonymization rules (e.g., if for a given consumer of the feature mapping mask remove any information in the data sample about the UE identification; or the identification of slices or network functions).

According to an example, a first entity is provided for a communication network, in particular a mobile communication network. The first entity is configured to obtain a feature mapping indication from another entity of, e.g., the communication network, wherein the feature mapping indication defines the characteristics of a relationship between a set of data samples and properties of data in the data samples of the set of data samples for an analytics model at an analytics stage, in relation to a given analytics consumer.

The first entity can create a feature mapping data structure based on at least one of a request for a feature mapping data structure, a feature provisioning policy, and further obtained feature mapping data structures. In an example, the feature mapping data structure defines a second set of data samples based on the relationship between the set of data samples and the properties of the data in the data samples of the set of data samples for use with the analytics model at the analytics stage for the analytics consumer. That is, a feature mapping data structure represents the selected data samples related to an analytics ID at a given analytics stage (e.g., training or inference) for an analytics service consumer, which are the result of the application of at least one of properties and processes to collected or stored data, such properties or processes being pre-defined in rules and requested by the analytics service consumer.

The feature mapping indication comprises the request for a feature mapping data structure, such request being any of the following:
a request for feature mapping creation (e.g., direct request for generation of a feature mapping data structure), such request comprising the fields for request of feature mapping creation and, optionally, a flag to indicate the immediate retrieval of the created feature mapping data structure.

a request for feature mapping fetching/retrieval (e.g., direct request for retrieval of a feature mapping data structure), such request comprising the filters for feature mapping fetching and, optionally, a flag to indicate the immediate retrieval of the feature mapping data structure.

a request for analytics output inference (e.g., indirect request for a feature mapping data structure related to a request for an analytics output from an analytics model) which will lead to any of the following cases: when the model for supporting the inference is available, this will trigger the creation of a feature mapping for supporting the model inference for such requested analytics output, or, when the model for supporting the inference is not available, this will trigger the creation of both the feature mapping for supporting the model training and the model inference for such a requested analytics output.

a request for model training (e.g., indirect request for a feature mapping data structure related to a request for model training) which will lead to the following case: when the feature mapping indication is a request for model training, this will trigger the creation of a feature mapping for supporting the model inference for such a requested model.

In an example, the feature mapping data structure can be provided to another entity in response to a feature mapping indication. At least one of a created and obtained feature mapping data structure can be used for the processing of an analytics output inference request or processing of a model training request or further processing of the request for feature mapping fetching.

Figure 2:
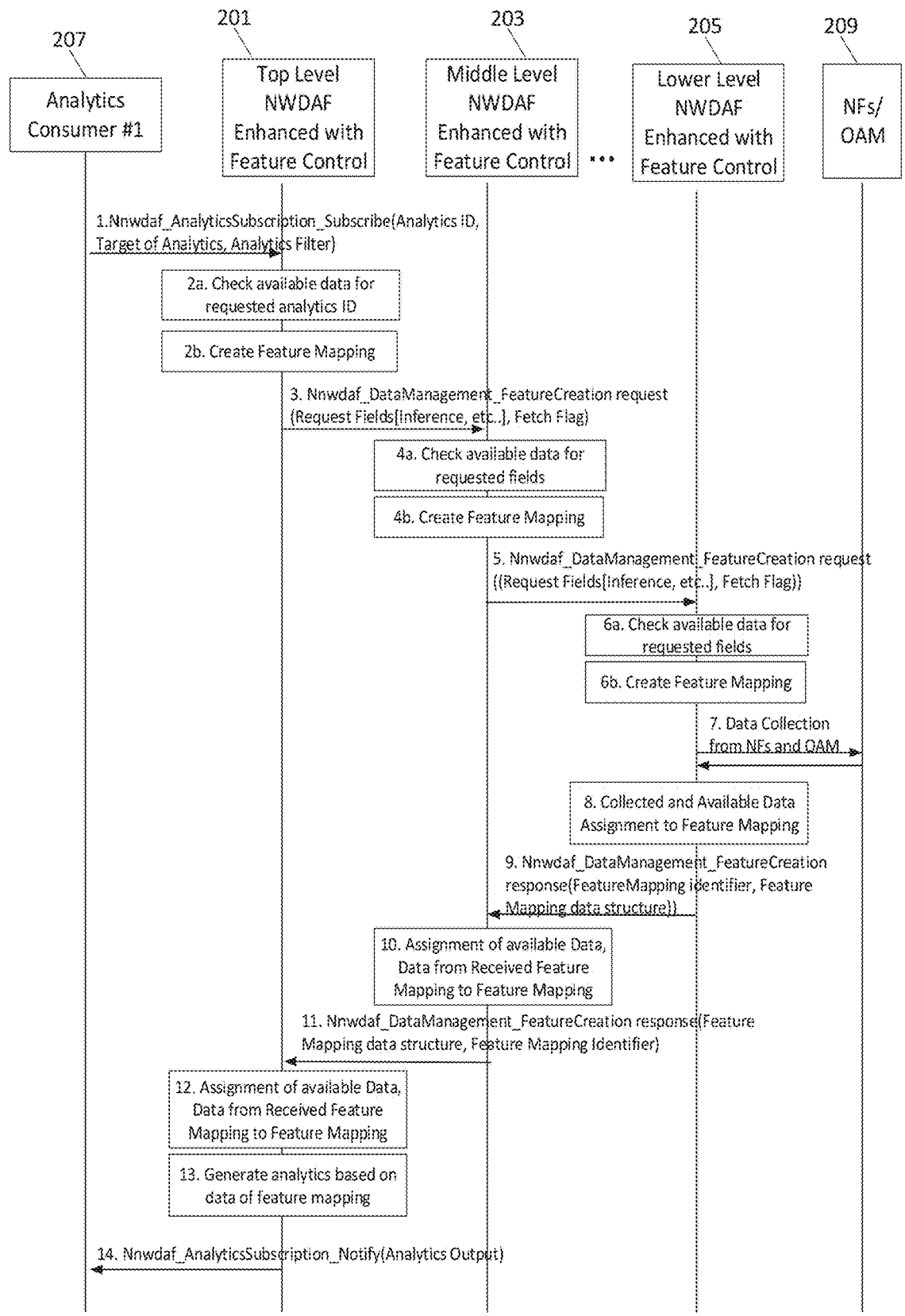
FIG. 2 is a schematic representation of interactions between network functions deployed in a hierarchical mode, according to an example.

FIG. 2 is a schematic representation of interactions between network functions deployed in a hierarchical mode, according to an example. In the example of FIG. 2, the network functions are NWDAFs deployed in a hierarchical mode. Two indications are discussed with reference to FIG. 2: a) request for an analytics output generation that leads to the creation of a feature mapping, and b) the request for feature mapping from one NWDAF in a higher level of the hierarchy to an NWDAF in a lower level of the hierarchy.

In the context of FIG. 2, all NWDAFs in the system are considered to have the capability of Feature Control (i.e., the proposed Entity Enhanced with Feature Control 101 can be embedded in each NWDAF instance 201, 203, 205). In the example of FIG. 2, a top level NWDAF 201 of the hierarchy receives a request, in block 1, to generate analytics output (e.g., Analytics ID), and does not have all the available data to create a feature mapping data structure for a corresponding inference stage in order to generate the requested analytics ID. In this case, the top level NWDAF 201 requires inference stage data from other NWDAFs in the hierarchy to generate the analytics output. The data in this example is related to a sample dataset associated with an analytics ID for the analytics consumer 207 in question, and for an inference stage of an analytics generation process. As noted above, the feature mapping is the data structure that can be created to control this relationship for a sample dataset or feature dataset.

As can be seen in FIG. 2, the NWDAF 201 that has received the request (1) can thus check, in block 2a, that it has available data for the requested analytics ID. If it does, it can create, in block 2b, a feature mapping in response to the request. If it does not, it can request, in block 3, the required information from another NWDAF 203 that is lower in the hierarchy. This NWDAF can perform similar checks, in block 4a, and either create, in block 4b, the feature mapping or request, in block 5, the required information from another NWDAF 205 that is lower than it in the hierarchy. The same checks can be performed, in block 6a, at NWDAF 205 that has received the request (5). If NWDAF 205 has available data for the requested analytics ID, it can create, in block 6b, the feature mapping. If it does not, it can perform data collection, in block 7, for the required information from another network function 209. The collected data can be sent to the NWDAF 205 and assigned to a feature mapping relating to the original request from the consumer. Depending on the location of the data, the data and the feature mapping can be cascaded back up the hierarchy (blocks 8-11) to the NWDAF 201, where collected data and available data are assigned to the feature mapping requested in each level as per blocks 8, 10, 12, and the resulting feature mapping is sent from one level of the hierarchy to the next level as per blocks 9 and 11, until the feature mapping reaches the NWDAF 201 capable of generating the analytics based on the data of the feature mapping (block 13), and this NWDAF 201 can send, in block 14, the analytics output to the analytics consumer 207.

Figure 3:
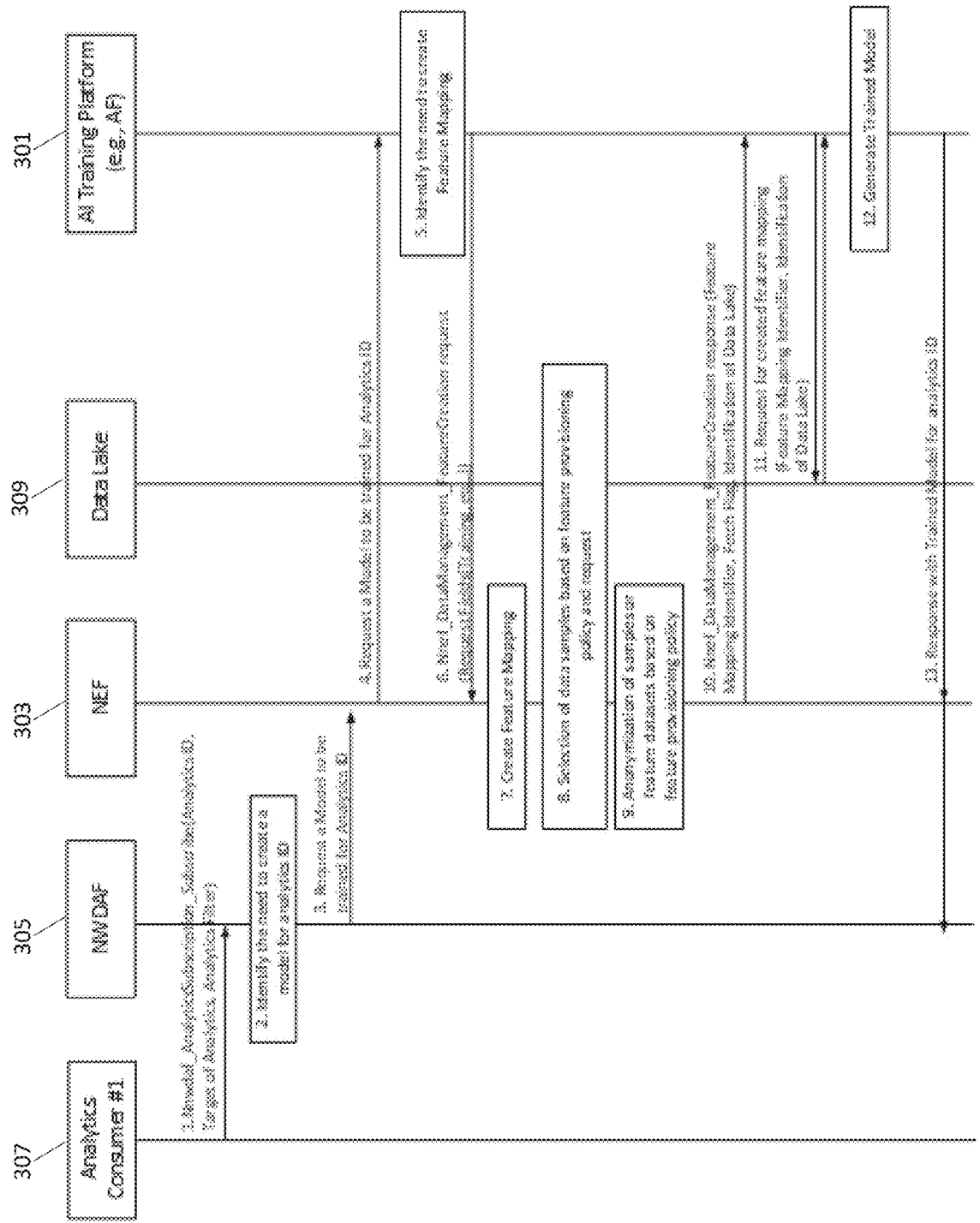
FIG. 3 is a schematic representation of interactions amongst network functions configured with inference capability, according to an example.

FIG. 3 is a schematic representation of interactions amongst network functions configured with inference capability according to an example. In the example of FIG. 3, the network functions are NWDAFs that have received a request for analytics output generation (i.e., analytics inference) but which do not however have a trained model that is suitable for inferring the requested analytics ID.

With reference to FIG. 3, model training capability for analytics can be provided by a dedicated AI training Platform 301. The AI Training Platform 301 can be, for example, seen as an Application Function for a 5G system. In the example of FIG. 3, the NEF 303 is the entity mapped to the first entity (which is an Entity Enhanced with Feature Control). NWDAF 305 interacts with the AI Training Platform 301 via NEF 303 to acquire a trained model. The NEF 303 in this example has the role of relaying messages between the NWDAF 305 and the AI Training Platform 301, and the role of creating the feature mapping data structure that the AI training Platform 301 uses in order to train a model.

In the case that an operator does not want to share raw data samples with the AI Training Platform 301, it is therefore the role of the NEF 303 to create the feature mapping data structure for the training stage at the AI Training Platform 301 and, based on anonymization directives in a feature provisioning policy, the NEF 303 can then process and remove sensible operator information before providing the feature mapping data structure to the AI Training Platform 301.

Referring to FIG. 3, a request for an analytics ID is received from a consumer 307 by NWDAF 305 in block 1. In block 2, NWDAF 305 identifies the need to create a model for the received analytics ID, and, in block 3, sends a request for a model to be trained for the analytics ID to NEF 303. In block 4, NEF 303 sends a request for a model to be trained for the analytics ID to the AI training platform 301, which identifies, in block 5, the need to create a feature mapping. The AI training platform 301 thus sends a request, in block 6, to NEF 303 for creation of a feature mapping data structure. In block 7, NEF 303 creates the feature mapping data structure, and, with recourse to a data storage 309, obtains or selects, in block 8, data samples based on a feature provisioning policy and the request (1). In block 9, NEF 303 can anonymise the samples or feature datasets based on the feature provisioning policy, and can send a response, in block 10, to the AI training platform 301 providing an indication for the location of the created feature mapping data structure and corresponding obtained data samples. The AI training platform 301 can thus request, in block 11, the created feature mapping data structure and data from the data storage 309 and use this to generate a trained model in block 12. The trained model can then be sent, in block 13, via the NEF 305 to the NWDAF 305 where it can be used to provide a response for the analytics consumer 307.

Figure 4:
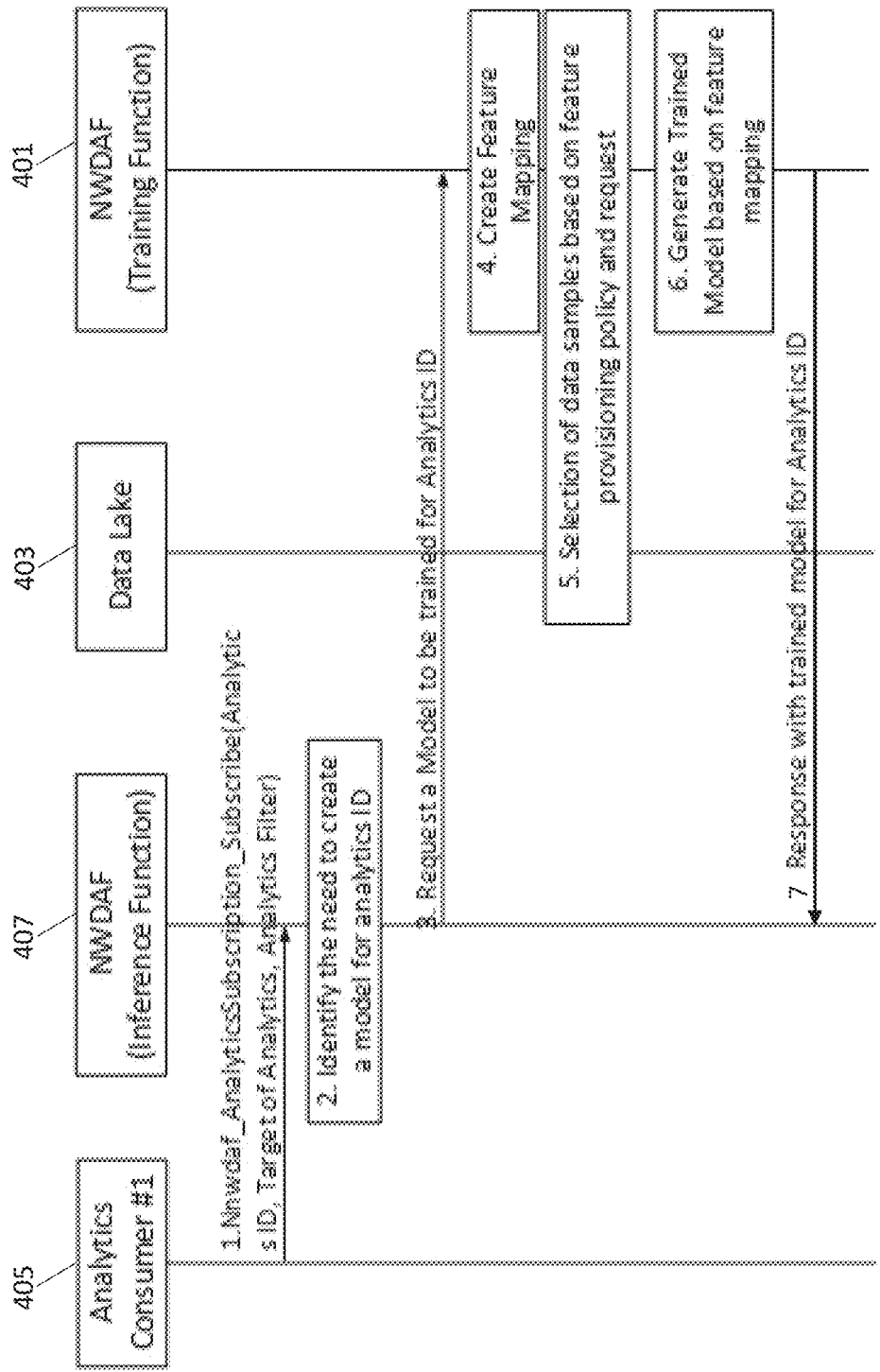
FIG. 4 is a schematic representation of interactions amongst network functions configured with inference capability interacting with another network function with model training functionality, according to an example.

FIG. 4 is a schematic representation of interactions amongst network functions configured with inference capability interacting with another network function with model training functionality, according to an example.

In the example of FIG. 4, a request for model training can trigger creation of a feature mapping data structure for a training stage within an NWDAF 401 with training functionality. The NWDAF 401 with training functionality is, in the example of FIG. 4, an Entity Enhanced with Feature Control. Upon receiving a request for model training from an analytics consumer 405, NWDAF 401 with training functionality can generate a trained model. In an example, the NWDAF 401 with training function and enhanced with the Feature control capability is able to interact with a Data lake 403, which can be a Storage Entity, for example, in order to select the data samples to be associated with the feature mapping data structure for the model training.

With reference to FIG. 4, an NWDAF 407 with inference (only) functionality receives, in block 1, a request for analytics from analytics consumer 405. NWDAF 407 checks and identifies, in block 2, the need to create a model for the analytics ID that is the subject of the request (1). NWDAF 407 sends, in block 3, a request for a model to be trained for the analytics ID to NWDAF 401 (i.e. NWDAF with training functionality). NWDAF 401 creates, in block 4, a feature mapping data structure, and, with recourse to storage entity 403 can select, in block 5, data samples based on a feature provisioning policy and the request. The NWDAF 401 can then generate, in block 6, a model using the data samples based on the feature mapping data structure, and send, in block 7, a trained model to NWDAF 407, where it can be used to fulfil the original request from analytics consumer 405.

Figure 5:
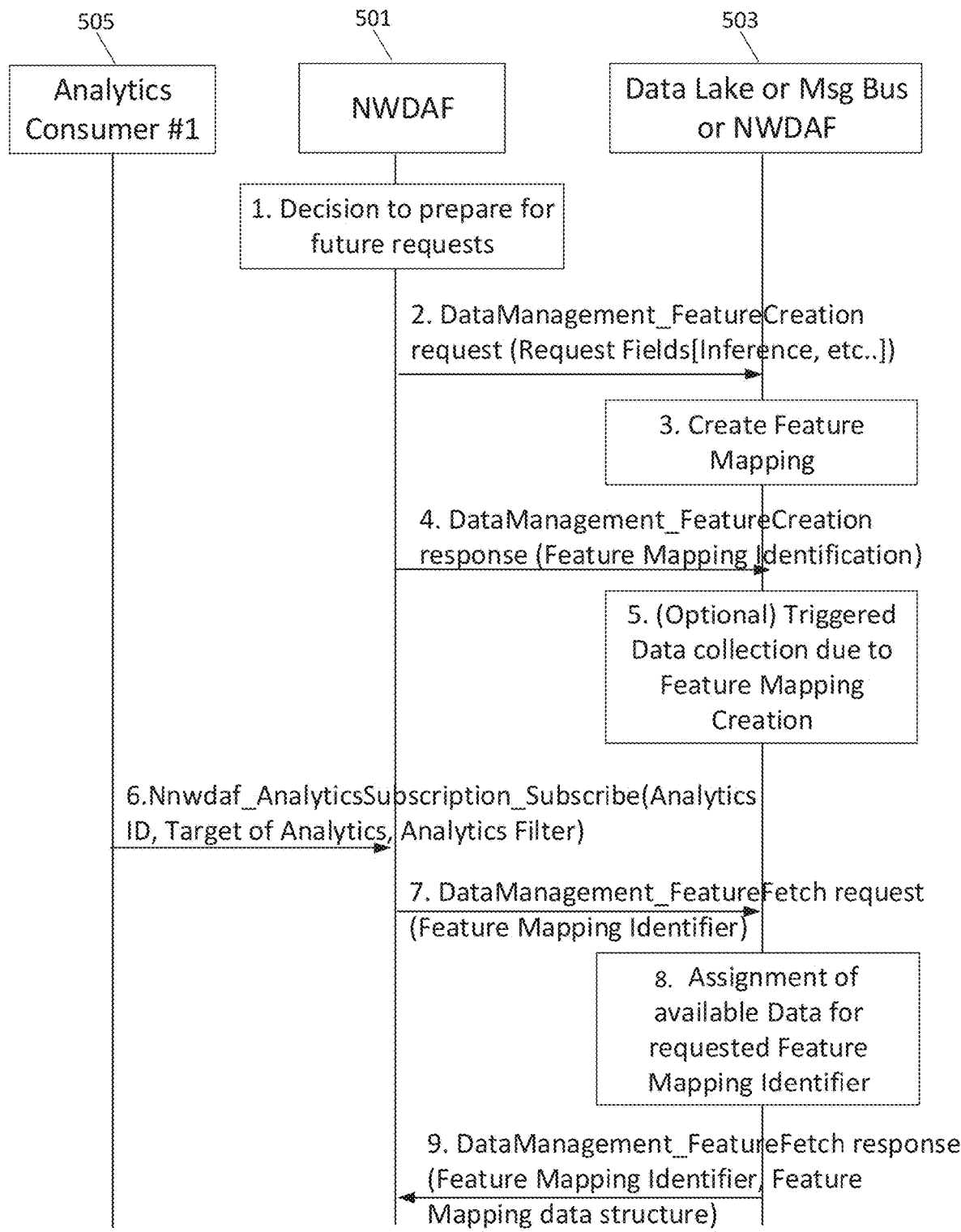
FIG. 5 is a schematic representation of interactions between network entities in the case that an Entity Enhanced with Feature Control is implemented in a Data Storage entity, a Message Bus System, or in a dedicated NWDAF instance, according to an example.

FIG. 5 is a schematic representation of interactions between network entities in the case that an Entity Enhanced with Feature Control is implemented in a Data Storage entity, a Message Bus System, or in a dedicated NWDAF instance, according to an example. Reference will be made, for the sake of simplicity, to a Data Lake, although it should be appreciated that this should also be taken to encompass the other entities mentioned above.

In the example of FIG. 5, an NWDAF 501 that can control data to be used for an analytics stage can comprise inference capabilities, and can interact with a Data Lake 503 (or a Message Bus System, or a dedicated NWDAF instance). NWDAF 501 can create a feature mapping data structure, as described above, in preparation for any future request for analytics inference. Furthermore, NWDAF 501 can retrieve a feature mapping data structure when an analytics request (i.e., an analytics output request) is received.

With reference to FIG. 5, NWDAF 501 decides to prepare for future requests, in block 1, and sends, in block 2, a request for generation of a feature mapping data structure to Data Lake 503. In the example of FIG. 5, the Data Lake 503 implements an Entity Enhanced with Feature Control. Accordingly, a feature mapping data structure can be created in block 3. In an example, in block 4, a request for generation of a feature mapping data structure is received by Data Lake 503, which may, optionally, trigger data collection, in block 5. In another example, a request for analytics comprising a feature mapping identifier from the analytics consumer 505 is received, in block 6, at NWDAF 501 and can be used to send a request, in block 7, to Data Lake 503. Upon receipt, Data Lake 503 can assign, in block 8, available data for the requested feature mapping identifier, and a response can be sent, in block 9, to NWDAF 9 based on the assigned data.

Common to all examples described above with reference to FIGS. 1 to 5 is the definition of a Nxxxx_DataManagement service that comprises the operations: Nxxxx_DataManagement_FeatureCreation and Nxxxx_DataManagement_FeatureFetch.

If, according to an example, the Enhanced Entity for Feature Control is mapped to:

an NWDAF, then the service will be Nnwdaf_DataManagement service, a NEF, then the service will be Nnwdaf_DataManagement service, or a Data Storage, then the service will be DataManagement service.

According to an example, a request for the service operation Nxxxx_DataManagement_FeatureCreation can include any one or more of:

Analytics ID,

Analytics Filter Information, such as that defined in the 3GPP standard TS 23.288, for example, and extended with statistical properties or methods for data samples to be included in a feature mapping data structure (as defined above), Analytics Reporting Information, such as that defined in the 3GPP standard TS 23.288, for example, and extended with any one or more of:

an interval of time for sample association;

a DC mode;

(optional) at least one of a minimum and maximum number of samples to be included in the feature mapping;

a fetch flag, which indicates that the feature mapping needs to be generated and included in the response, and a deadline, which indicates the limit of time for providing the feature mapping when the fetch flag is included.

The response for the service operation Nxxxx_DataManagement_FeatureCreate can include the feature mapping identification and, depending on whether it is included, the fetch flag for the generated feature mapping.

The request for the service operation Nxxxx_DataManagement_FeatureFetch can include the feature mapping identification.

The response for the service operation Nxxxx_DataManagement_FeatureFetch can include the feature mapping identification and the generated feature mapping data structure.

In a further example, with reference to FIGS. 1 to 5, the definition service exposing the feature mapping data structure can be based on an Event Exposure framework, such as that defined in the 3GPP standard TS 23.502 Clause 4.15, for example.

The Entity Enhanced with Feature Control 101 can expose the Nxxx_EventExposure service. Consumers of this service can use parameters as defined in, for example, the 3GPP standard TS 23.502, Clause 4.15.1, as well as any one or more of:

- Event ID(s) set to "Feature Mapping" event type,
- Target of Event Reporting including a tuple with: analytics ID; type of feature mapping, which can be set to "raw data samples" or "pre-processed data samples" or a combination of both, for example; and analytics stage (e.g., inference or training),
- Event Filter Information, which can include any one or more of:
  - fields related to the analytics ID indicated in the target of event reporting, such as: a target of analytics information (e.g., any UE, list of UEs, groups of UEs); analytics filter information (e.g., area of interest, DNN, Application, S-NSSAI (Single Network Slice Selection Assistance Information)). The analytics ID indicated in the request also determines the type of data to be collected and associated with the feature mapping data structure.
  - statistical properties or methods for data samples in the feature mapping data structure: for example, one or more parameters that define requirements for the preparation of the collected data (e.g., maximum values, average values) or processes (e.g. usage of time dependent weights, covariance) to be used for selection mechanisms of the data samples to be associated with a feature mapping data structure.
- Event Reporting Information, in addition to the parameters defined in, for example, the 3GPP standard TS 23.502, Clause 4.15.1, which can include any one or more of the following parameters:
  - an interval of time for sample association;
  - a data collection mode (DC mode), which indicates the type of collection mechanisms to be considered for the data required by the consumer. In an example, as noted above, this parameter can set to at least one of a) "runtime", b) "offline", and c) "historical". When the "historical" DC mode is included, the interval of the historical time window can be included as an input parameter. In an example, the default DC modes for an inference or training analytics stage are, respectively, "runtime" and "offline".
  - (optional) at least one of a minimum and maximum number of samples to be included in the feature mapping.
- A Notification Target Address plus a Notification Correlation ID, where the Notification Correlation ID is the unique identification for the feature mapping data structure being generated for the requested target of event reporting.

In a further example, with reference to FIGS. 1 to 5, the definition service exposing the feature mapping data structure is based on an extension of the existing NWDAF services for providing analytics output. The extension enables NWDAF to provide the feature mapping data structure (i.e., data samples) to enable inference or model training for an analytics ID instead of a calculated analytics output. This is compatible with NWDAF-to-NWDAF interactions.

The input and output parameters of the NWDAF service interfaces Nnwdaf_AnalyticsSubscription and Nnwdaf_AnalyticsInfo defined, respectively, in the 3GPP standard TS 23.288, Clause 7.2 and Clause 7.3, can be extended. The extensions to input parameters of such NWDAF services can comprise any one or more of:

- An indication that the service is being invoked in order to retrieve the feature mapping data structure associated with the analytics ID.
- Analytics Filter Information, which can include statistical properties or methods for data samples to be included in feature mapping. This parameter can be used to define requirements for the preparation of the collected data (e.g., maximum values, average values) or processes (e.g. usage of time dependent weights, covariance) to be used for selection mechanisms of the data samples to be associated with a feature mapping data structure.
- Analytics Reporting Information, which can comprise any one or more of:
  - an interval of time for sample association;
  - a DC mode, which can be set to at least one of "runtime" (based on existing event exposure mechanisms for NFs sending periodic notifications of the events that should be collected), "offline" (based on mechanisms that reduce notification signalling from NFs), and "historical". The default DC modes for an analytics stage are: for analytics inference, "runtime", and for analytics training, "offline". When the "historical" DC mode is included, the interval of the historical time window can be included as an input parameter.
  - (optional) at least one of a minimum and maximum number of samples to be included in the feature mapping.

The extensions of output parameters of these NWDAF services can mean that the following parameters are not sent as output: analytics output, validity period, probability of assertion. Instead, the output can include the feature mapping data structure generated for the analytics ID based on the input parameters of the requested service and the rules for associating the data samples to the feature mapping data structure.

According to an example, an Enhanced Entity for Feature Control, which may form a first or second entity of a communication network, enables a reduction in the processing load and preparation of raw collected data for training or inference. This is because not all entities related to analytics in a mobile network (e.g., all NWDAFs) need to process the collected raw data (e.g., number of UEs in a Cell, N3 throughput value of the UPF for a given point in time etc.), and apply feature engineering techniques (e.g., calculate the skewness of the N3 throughput of UPF) to generate pre-processed data (e.g., feature datasets) that is used as input for the calculation/generation of an analytics output. In examples, specific entities of the mobile operator (e.g., NWDAF) can be enhanced as described above, and such entities can control the use of pre-processed data (i.e., features) to at least one of multiple AI training platforms and models.

When using data from different regions of the same mobile operator, an NWDAF of one intra-PLMN region can obtain feature datasets from another NWDAF in a different intra-PLMN region without having to perform any specific data collection directly in the different region. This is advantageous in terms of privacy. An operator can thus define in a feature provisioning policy a mechanism for securing the privacy of the data from each one of multiple different regions (e.g., anonymization, masking, etc.).

Furthermore, in the exchange of online datasets (to be used for inference) among different intra-PLMN instances of NWDAF, data collection from lower level to higher level NWDAFs can be used, when such NWDAFs are organized in a hierarchical deployment. Therefore, data can be collected from lower levels of the hierarchy in order to at least one of generate analytics output (inference) and to train analytics models (training, testing). NWDAFs, for example, from top and middle (n levels in the middle) levels can be enhanced with the Feature Control Capability according to examples.

FIG. 6 is a schematic representation of a method according to an example. The method of FIG. 6 may be suitable for a communication network, in particular a mobile communication network, for example.

In block 601, a feature mapping indication is received at a first entity from a second entity of the communication network. The first entity is an enhanced entity with feature control capability that can be used to reduce the processing load and preparation of raw collected data for training or inference. The first entity can control the use of pre-processed data (i.e., features) to at least one of multiple AI training platforms and models. The feature mapping indication defines characteristics of a relationship between a set of data samples and properties of data in the data samples of the set of data samples for an analytics model at an analytics stage. The feature mapping indication comprises a request for a feature mapping data structure, the feature mapping data structure defining a second set of data samples based on the relationship between the set of data samples and the properties of the data in the data samples of the set of data samples for use with the analytics model at the analytics stage for an analytics consumer.

In block 603, the feature mapping data structure is generated at the first entity for use with the analytics model at the analytics stage based on at least one of the feature mapping indication received from the second entity and a feature provisioning policy. The feature provisioning policy defines a set of at least one of properties and processes to be applied to the data in the data samples of the set of data samples.

Figure 7:
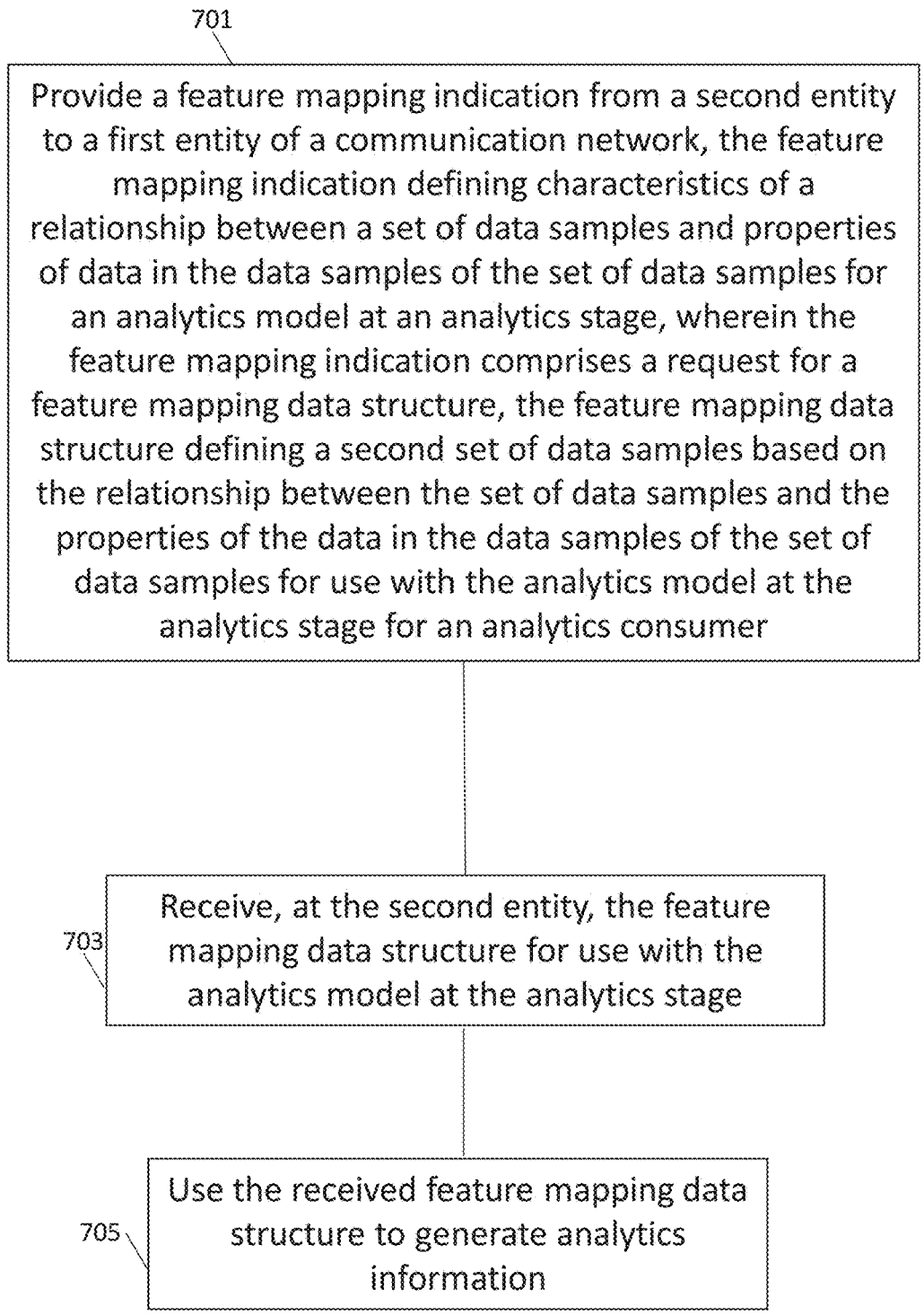
FIG. 7 is a schematic representation of a method according to an example.

FIG. 7 is a schematic representation of a method according to an example. The method of FIG. 7 may be suitable for a communication network, in particular a mobile communication network, for example.

In block 701, a feature mapping indication is provided from a second entity to a first entity of the communication network. The feature mapping indication defines characteristics of a relationship between a set of data samples and properties of data in the data samples of the set of data samples for an analytics model at an analytics stage. The feature mapping indication comprises a request for a feature mapping data structure, the feature mapping data structure defining a second set of data samples based on the relationship between the set of data samples and the properties of the data in the data samples of the set of data samples for use with the analytics model at the analytics stage for an analytics consumer.

In block 703, the feature mapping data structure for use with the analytics model at the analytics stage is received. In block 705, the received feature mapping data structure is used to generate analytics information.

The method described with reference to FIG. 6 or 7 may be performed by the device 101, e.g. an NWDAF.

The person skilled in the art will understand that the "blocks" ("units") of the various figures (method and apparatus) represent or describe functionalities of embodiments (rather than necessarily individual "units" in hardware or software) and thus describe equally functions or features of apparatus embodiments as well as method embodiments (unit=step). In the several embodiments, examples or aspects provided herein, it should be understood that the disclosed system, apparatus, and method may be implemented in other manners. For example, a described apparatus embodiment is merely exemplary. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

What is claimed is:

1. A first entity for a communication network, the first entity comprising a processor and a memory having processor-executable instructions stored thereon, wherein the processor executes the instructions which cause the first entity to:

receive a feature mapping indication from a second entity of the communication network,
wherein the feature mapping indication comprises characteristics of a relationship between a set of data samples and properties of data in the data samples of the set of data samples for an analytics model at an analytics stage,
wherein the feature mapping indication comprises a request for a feature mapping data structure, which defines a second set of data samples based on the relationship between the set of data samples and the properties of the data in the data samples of the set of data samples for use with the analytics model at the analytics stage for an analytics consumer; and
generate the feature mapping data structure for use with the analytics model at the analytics stage based on at least one of the feature mapping indication received from the second entity and a feature provisioning policy, wherein the feature provisioning policy defines a set of at least one of properties and processes to be applied to the data in the data samples of the set of data samples;
wherein the feature provisioning policy comprises any one or more of the following information fields: an identification of an analytics consumer of a feature, a network slice identification, a network operator identification, a type of feature mapping, at least one of an allowed and restricted feature selection technique, at least one of an allowed and restricted feature type, at least one of an allowed and restricted area of interest, at least one of an allowed and restricted type of analytics models, an aggregation level per type of feature, and an anonymization rule; and
send the feature mapping data structure back to the second entity.

2. The first entity as claimed in claim 1, wherein the processor further executes the instructions which cause the first entity to:

obtain one or more feature mapping data structures for use with the analytics model at the analytics stage based on one or more further feature mapping data structures from one or more other entities of the communication network.

3. The first entity as claimed in claim 1, wherein the analytics stage comprises one or more of an inference stage, a training stage, a testing stage, a validation stage, an offline data collection, and an online data collection.

4. The first entity as claimed in claim 1, wherein the feature mapping indication comprises a direct request for generating the feature mapping data structure, wherein the direct request comprises at least one of an information field defining a request for creating the feature mapping data structure and a flag indicating a requirement for immediate retrieval of the feature mapping data structure.

5. The first entity as claimed in claim 1, wherein the feature mapping indication comprises a direct request for retrieval of the feature mapping data structure according to a set of criteria comprising one or more filters enabling a selection of the data samples to be associated with the feature mapping data structure.

6. The first entity as claimed in claim 1, wherein the feature mapping indication comprises an indirect request for the feature mapping data structure related to a request for an analytics output from the analytics model, and the first entity is further configured to generate or obtain the feature mapping data structure for supporting inference using the analytics model for the analytics output.

7. The first entity as claimed in claim 1, wherein the feature mapping indication comprises an indirect request for the feature mapping data structure related to a request for model training, and the first entity is further configured to generate or obtain the feature mapping data structure for supporting the model training.

8. The first entity as claimed in claim 1, wherein the request for the feature mapping data structure comprises at least one of:
  data representing a flag for indicating immediate retrieval of the feature mapping data structure, and
  a data collection mode.

9. The first entity as claimed in claim 1, wherein the processor further executes the instructions which cause the first entity to:
  provide the feature mapping data structure to another entity of the communication network in response to the feature mapping indication.

10. The first entity as claimed in claim 1, wherein the processor further executes the instructions which cause the first entity to:
  access one or more data repositories, or is logically co-located with a data repository, and
  wherein the data repository comprises the data samples of the set of data samples.

11. The first entity as claimed in claim 1, wherein the processor further executes the instructions which cause the first entity to:
  provide at least one of an identification for the feature mapping data structure obtained in accordance with the feature mapping indication, and an identification of a storage repository of the communication network, and
  wherein the storage repository comprises the feature mapping data structure.

12. The first entity as claimed in claim 1, wherein a direct request for creation of the feature mapping data structure comprises any one or more of the following information fields: an analytics type identification, a data collection mode, a model type identification, a model version identification, the analytics stage, an analytics consumer identification, a type of data, a type of feature, an aggregation level per type of feature, a statistical property of a data sample, a statistical method to be applied, an area of interest, a target of analytics reporting, analytics filter information, an interval of time for sample selection, at least one of a minimum and maximum number of samples for sample selection, a network slice identification, a network operator identification, a deadline for generating and providing the feature mapping data structure, and a data collection mechanism to be used for the retrieval of at least one of raw data and preprocessed data.

13. The first entity as claimed in claim 1, wherein the feature mapping data structure comprises any one or more of the following information fields: a feature mapping identification, an identification of the analytics consumer related to the feature mapping data structure, an analytics type identification, a type of feature mapping, a model type for the analytics identification, a model version for each model type, a model stage, a statistical property of data samples, a type of data, a feature type, a feature sample value, a reference for the feature sample identification, a reference for an entity storing the feature sample, a reference for an entity storing the data samples, and a timestamp of at least one of a created/updated feature and data samples.

14. A method applied to a communication network, the method comprising:
  receiving, at a first entity, a feature mapping indication from a second entity of the communication network,
    wherein the feature mapping indication defining characteristics of a relationship between a set of data samples and properties of data in the data samples of the set of data samples for an analytics model at an analytics stage,
    wherein the feature mapping indication comprises a request for a feature mapping data structure, the feature mapping data structure defining a second set of data samples based on the relationship between the set of data samples and the properties of the data in the data samples of the set of data samples for use with the analytics model at the analytics stage for an analytics consumer;
  generating, at the first entity, the feature mapping data structure for use with the analytics model at the analytics stage based on at least one of the feature mapping indication received from the second entity, and a feature provisioning policy, wherein the feature provisioning policy defines a set of at least one of properties and processes to be applied to the data in the data samples of the set of data samples; and
  wherein the feature provisioning policy comprises any one or more of the following information fields: an identification of an analytics consumer of a feature, a network slice identification, a network operator identification, a type of feature mapping, at least one of an allowed and restricted feature selection technique, at least one of an allowed and restricted feature type, at least one of an allowed and restricted area of interest, at least one of an allowed and restricted type of analytics models, an aggregation level per type of feature, and an anony mization rule; and
  sending the feature mapping data structure back to the second entity.

15. The method as claimed in claim 14, further comprising:
obtaining, at the first entity, one or more feature mapping data structures for use with the analytics model at the analytics stage based on one or more further feature mapping data structures from one or more other entities of the communication network.

16. The method as claimed in claim 14, wherein the analytics stage comprises one or more of an inference stage, a training stage, a testing stage, a validation stage, an offline data collection, and an online data collection.

17. The method as claimed in claim 14, wherein the feature mapping indication comprises a direct request for generating the feature mapping data structure, wherein the direct request comprises at least one of an information field defining a request for creating the feature mapping data structure and a flag indicating a requirement for immediate retrieval of the feature mapping data structure.

18. The method as claimed in claim 14, wherein the feature mapping indication comprises a direct request for retrieval of the feature mapping data structure according to a set of criteria comprising one or more filters, enabling a selection of the data samples to be associated with the feature mapping data structure.

19. The method as claimed in claim 14, wherein the feature mapping indication comprises an indirect request for the feature mapping data structure related to a request for an analytics output from the analytics model, the method further comprises, at the first entity, generating or obtaining the feature mapping data structure for supporting inference using the analytics model for the analytics output.

20. The method as claimed in claim 14, wherein the feature mapping indication comprises an indirect request for the feature mapping data structure related to a request for model training, the method further comprises, at the first entity, generating or obtaining the feature mapping data structure for supporting the model training.

* * * * *